United States Patent

Ramisch et al.

[15] 3,637,532
[45] Jan. 25, 1972

[54] SINTERED COLD-CONDUCTOR RESISTOR BODY AND METHOD FOR ITS PRODUCTION

[72] Inventors: Emil Ramisch; Werner Schwan, both of Munich, Germany

[73] Assignee: Siemens Aktiengesellschaft, Berlin and Munich, Germany

[22] Filed: Aug. 1, 1969

[21] Appl. No.: 852,147

Related U.S. Application Data

[63] Continuation of Ser. No. 485,238, Sept. 7, 1965, abandoned.

[30] Foreign Application Priority Data

Sept. 17, 1964 Germany ................................S 93 193

[52] U.S. Cl..............................252/520, 252/521, 338/22, 106/39
[51] Int. Cl.........................................................H01b 1/06
[58] Field of Search...............252/518, 520, 521, 62.3, 62.9; 106/39

[56] References Cited

UNITED STATES PATENTS

| | | | |
|---|---|---|---|
| 2,981,699 | 3/1961 | Ichikawa | 252/521 |
| 3,044,968 | 7/1962 | Ichikawa | 252/521 |

FOREIGN PATENTS OR APPLICATIONS

| | | | |
|---|---|---|---|
| 714,965 | 9/1954 | Great Britain | 252/521 |

Primary Examiner—John D. Welsh
Attorney—Hill, Sherman, Meroni, Gross and Simpson

[57] ABSTRACT

Positive temperature coefficient resistor materials composed of doped ferroelectric substances such as barium titanate, the materials including at least two discrete crystalline phases, one composed of a material having a Curie temperature above and the other composed of a material having a Curie temperature below the Curie temperature of the composite, the composite having a substantially improved load quotient.

12 Claims, 5 Drawing Figures

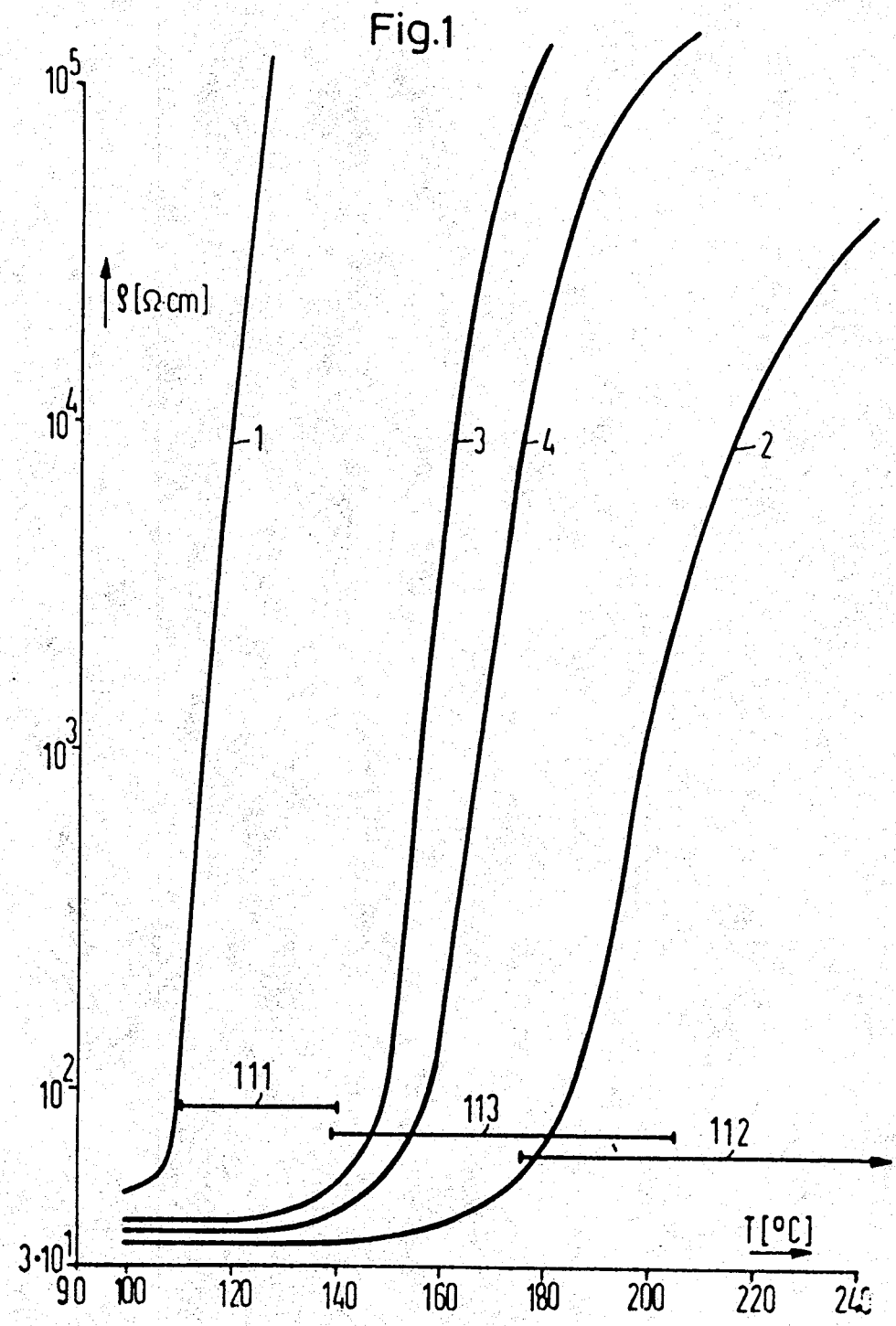

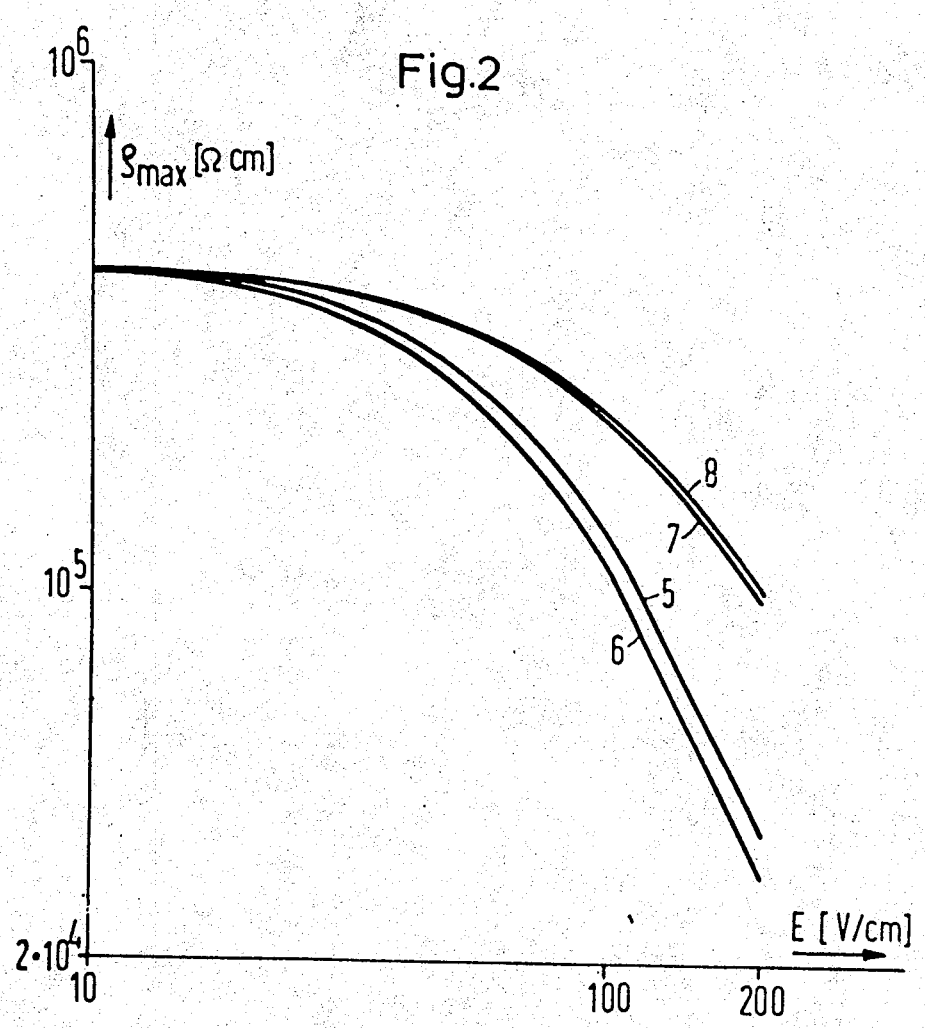
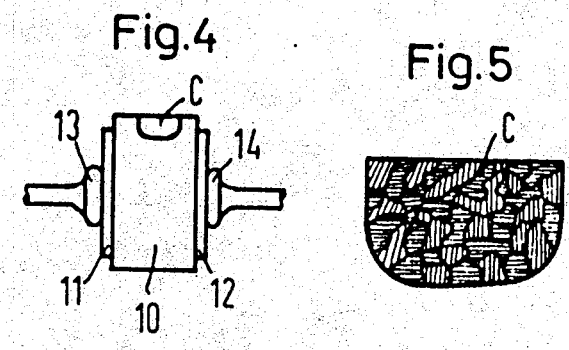

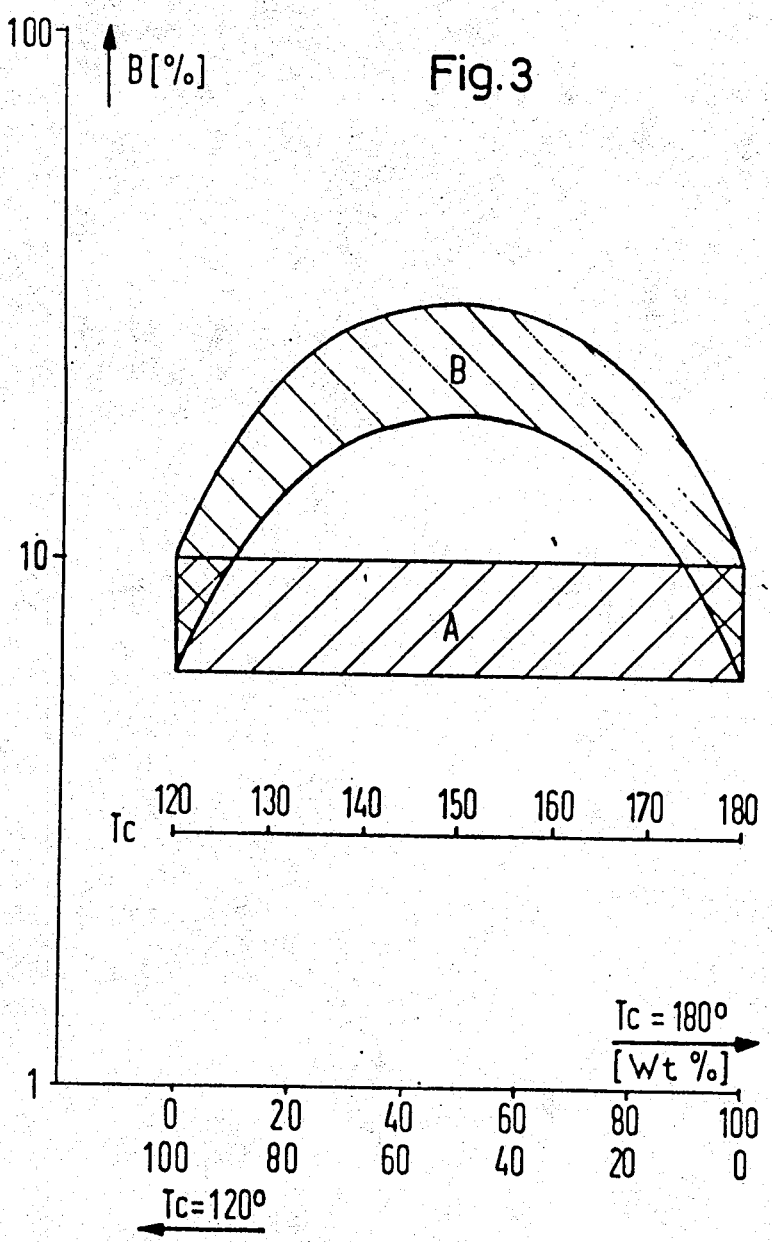

SINTERED COLD-CONDUCTOR RESISTOR BODY AND METHOD FOR ITS PRODUCTION

This application is a continuation of Ser. No. 485,238, filed Sept. 7, 1965, now abandoned.

The invention relates to a sintered electrical resistor body of ceramic material having a high positive temperature coefficient of resistance (PTC-resistor). The ceramic material consists of a doped ferroelectric substance having a perowskite structure, such as, for example, barium titanate doped with antimony for the production of N-conductivity. Also other known substances having perowskite structures and other known doping agents are suitable as materials for ceramic PTC-resistors. Generally, these materials have perowskite structures which are constituted essentially on the basis of barium titanate and present in the form of mixed crystals which corresponds to the general formula $$Me^{II}Me^{IV}O_3$$

in which $Me^{II}$ is chiefly one or several alkaline earth metals and/or lead and $Me^{IV}$ is preferably one or more tetravalent metals, such as, for example, titanium, tin and/or Zirconium. $Me^{II}$ and $Me^{IV}$ are so-called perowskite structure-forming elements. The doping substances in themselves are not perowskite structure-forming substances, but are present in certain small amounts on $Me^{II}$—and/or $Me^{IV}$—places in the perowskite lattice. The valence of these doping substances differs from II and IV, so that through the doping, N- or P-conductivity of the material results. As doping substances, accordingly, there come into consideration chiefly antimony, niobium, bismuth, tungsten and rare earth metals.

The materials having perowskite structure occur in various crystal modifications. Above the Curie temperature the crystal lattice is cubic, while at the Curie temperature or in the Curie temperature range it is transformed into the ferroelectric tetragonal form and, at still lower temperatures it may pass over into the orthorhombic crystal modification. Of interest in the present case is the transformation at the Curie temperature.

It is well known that the Curie temperature which, for example, in the case of pure barium titanate lies at about 120° C., can be shifted by additions such as strontium, zirconium or tin to lower temperatures, and by additions such as lead to higher temperatures.

The above-mentioned materials have, below the Curie temperature, a relatively low specific electric resistance, which lies at about 100 ohm-cm. In the vicinity of the Curie temperature the specific resistance climbs relatively sharply, as a rule by about four powers of 10, to maximum values up to $10^6$ ohm-cm. This strong increase in the resistance takes place within a temperature range beginning approximately at the Curie temperature, with the resistance maximum being reached at temperatures which lie about 40° to 150° above the Curie temperature. Ceramic resistors of the type described therefore, have in the range of the Curie temperature a strong positive change of the resistance value in dependence on the temperature. In the temperature range of the resistance maximum a strong dependence of the resistance value on the applied field strength (volt/cm.) becomes noticeable. As stated in the literature, the specific resistance begins to decline severely at field strengths from the order of 10 v./cm. upward.

As a measure for the decline of the specific resistance with increasingly applied field strength, designated in the following as the varistor effect—the load quotient $B$ shall here be defined as:

$$B(\text{in percent}) = \frac{R_{max} \text{ at } 200 \text{v./cm.}}{R_{max} \text{ at } 10 \text{v./cm.}} \cdot 100$$

Here $R_{max}$ equals the particular maximal resistance values above the temperature-dependent resistance increase at the particular given measuring field strengths (200 and 10 v./cm., respectively).

Obviously, the ceramic PTC-resistor bodies must be provided with contact coatings which are applied to the bodies free of a blocking layer, as described, for example, in U.S. Pat. No. 3,027,529 or in the article "Positive temperature coefficient of resistance thermistor materials for electronic applications" by H. A. Sauer and S. S. Flaschen, published in "Proc. of the Electronic Components Symposium," May 1956.

The load quotient defined in this manner for pure doped barium titanate lies about between 6 and 10 percent. For materials which, through perowskite-forming additives, have other Curie temperatures, the values of the load quotient lie in about the same range.

In order to be able to also use ceramic PTC-resistors with higher field strengths, it is necessary to reduce the danger of destruction there existing. One of the objects of the present invention is to reduce the varistor effect, that is, to increase the load quotient.

This problem is solved by providing a sintered PTC-resistor body of the type initially referred to, which is characterized, according to the invention, by the feature that it consists of at least two crystalline main phases, of which one phase has a temperature range of increasing resistance which lies above, and another phase has a temperature range of increasing resistance which lies below the desired resulting temperature range of increasing resistance of the resistor body.

As a result of the ceramic sintering process there is disposed between the individual crystal granules of the main phases an interphase which arises, through diffusion processes at the sintering temperature, at the granule boundaries. For the purposes of the present invention crystal granules which are alike, both in their composition and in their properties, are designated as a main phase.

The PTC-resistor bodies according to the invention differ, therefore from the known ceramic resistor bodies in that they contain at least two crystalline main phases, while the known bodies are essentially monophase. As methods of investigation for the determination of such bodies at least having a two-phased structure according to the invention there are suggested, for example, X-ray structure analysis or the method of formation of etched figures, which can then be analyzed under a sufficiently high powered microscope.

The monophase state in the known resistance bodies results from known production processes which have in common the feature that for desired Curie temperatures differing from 120° C. both the perowskite-forming substances and also the doping substances in oxide form, or in the form of compounds yielding oxide on heating, such as, for example, carbonates are mixed with one another in corresponding quantitative relations and such mixture is heated to temperatures, for example of 1,000° C., at which the conversion reaction takes place to the perowskite material with the desired Curie temperature. The desired Curie temperature is dependent on the quantitative proportions of those substances which have an increasing or decreasing effect on the Curie temperature. These processes will be designated in the following as processes with common conversion of the initial components. The converted material is, as a rule, ground, treated with binders and plasticizing agents, shaped to the desired bodies and then subjected to sintering at temperatures above 1,300° C. The resistor bodies resulting according to these processes have the above-described drawback of the strong varistor effect.

In U.S. Pat. No. 3,027,529 previously mentioned, it has been proposed to keep the varistor effect, that is, the dependence of the resistance on an applied field strength, small through choice of the granule size and through use of crystal granules the size of which varies only to a slight degree about the selected granule size. The granule size there lies between 1 and $20\mu$ and should not go below 1 to $2\mu$. It is, to be sure, possible in this manner to reduce the varistor effect, but the production of a material and the formation of a sintered body of this material with a mean granule size maintained as precisely as possible presents in the fabrication of large numbers of bodies, difficulties in manufacturing technology, especially since the granule growth cannot be retarded by known additives for this purpose, such as, for example, iron oxide, because such granule growth-inhibiting additives sometimes completely alter the PTC-resistor properties, as for example by considerably increasing the specific resistance in the cold state of the resistor, that is by temperatures below the temperature dependent increase.

IN THE DRAWINGS

FIG. 1 is a chart illustrating the course of increasing resistance of different PTC-resistor materials;

FIG. 2 is a chart illustrating the dependence of specific resistance on applied field strengths;

FIG. 3 is a chart illustrating the dependence of the load quotient on the mixing ratio;

FIG. 4 illustrates a ceramic PTC-resistor according to the invention; and

FIG. 5 is an enlarged view of the portion C of FIG. 4, illustrating the two crystalline main phases.

In experiments which have led to the present invention it was ascertained, surprisingly, that through combination of two crystalline main phases each having by itself a low load quotient with differing Curie temperatures a PTC-resistor body results, which, on the one hand, presents a Curie temperature which lies between the individual Curie temperatures of the crystalline main phases and, on the other hand, shows a load quotient which is increased up to three times that of the individual main phases. If on the other hand, through common conversion of the starting components, present in a ratio of oxide components appropriate for the desired Curie temperature, there is established an essentially monophase body, which shows a load quotient which hardly differs from the individual load quotients of the perowskite materials which have been individually preformed. This will be additionally explained in the explanation of FIG. 3.

The desired temperature range of increasing resistance of the PTC-resistor bodies according to the invention results from the position of the temperature ranges of increasing resistance and the relative amounts of the individual crystalline main phases in the body. That is, with the presence of two crystalline main phases of which the one has, for example, a Curie temperature of 120° C. and the other, for example, a Curie temperature of 40° C. and these crystalline main phases are present in the ratio of 1:1 in the resistor body, the body will have a Curie temperature of 80° C. and thereby a temperature range of increasing resistance which begins at about 80° C.

Preferably one crystalline main phase consists of doped barium titanate with a temperature range of increasing resistance around 120° C. and the other crystalline main phase consists of doped substituted barium titanate, the temperature range of increasing resistance of which, in consequence of the proportion of substituents known per se lowering the Curie temperature lies below 100° C., in particular, below 60° C. As substituents lowering the Curie temperature there are advantageously used calcium and strontium in the cation constituent and/or tin or zirconium in the anion constituent, individually or in combination. The proportion of cation substituents amounts to 2 to 48 mol percent, with reference to the total molar amount of cations, and the proportion of anion substituents amounts to 1 to 15 mol percent, with reference to the total molar amount of anions.

It is, however, also possible according to the present invention for the one crystalline main phase to consist of doped substituted barium titanate whose temperature range of increasing resistance, in consequence of the proportion of Curie temperature increasing substituents known per se, for example lead, in amounts of 1 to 30 mol percent, lies above 130° C., preferably above 170° C., and in particular at 180° C., while the other crystalline main phase consists of doped substituted barium titanate whose temperature range of increasing resistance, in consequence of the proportion of Curie temperature lowering substituents known per se and given above, lies below 100° C., preferably at 60° C. Such a resistor body may, for example, have a Curie temperature of 120° C., such as is present in pure $BaTiO_3$, but the load quotient is improved as compared to that of pure $BaTiO_3$. The Curie temperature of 120° C. can be achieved, for example, by a 1:1 mixture of a material with a Curie temperature of 60° C. and a material with a Curie temperature of 180° C. It appears that with greater separation of the Curie temperatures of the materials to be mixed, the load quotient of the mixing body is more strongly improved, as compared to the load quotient of the monophase body with equal resulting Curie temperature.

Advantageously, one crystalline main phase consists of doped barium lead titanate and the other crystalline main phase consists of doped pure barium titanate with a Curie temperature at 120° C.

In any case, as already stated, the desired resulting temperature range of increasing resistance lies between the ranges of the individual crystalline main phases, in which, as is apparent from FIG. 1, overlapping of the temperature ranges is possible.

The PTC-resistor bodies according to the invention are produced by a process which, according to the invention, is characterized in that, first of all, the formation of the individual crystalline main phases is accomplished by the method that according to processes known per se doped ferroelectric perowskite materials of the oxides, of oxide yielding compounds such as, for example, carbonates, are individually produced, through individual mixing of the same, and converting at temperature up to about 1,100° C., following which these individually prefired perowskite materials are mixed with one another, in the amounts necessary for the desired resulting temperature range of increasing resistance, molded into bodies and sintered for about 1 hour at temperatures between 1,300° and 1,380° C.

It is advantageous and important to pay special attention to the mixing of the individual doped ferroelectric perowskite materials each preformed as a crystalline main phase. The widely used mixing of ceramic dielectric perowskite materials for the production of capacitor dielectrics, in which process the converted products are ground and mixed in common in aqueous grinding fluids, lead to the result that the preformed materials are attacked or affected by water, because the cation components, namely the alkaline earth metals, especially barium, can be dissolved out of the surface of the material. It is proposed, therefore, that the mixing of the doped ferroelectric perowskite materials each preformed as a crystalline main phase be carried out in a medium which will not attack or dissolve the materials, as for example, ethyl alcohol or acetone. However, since, these media frequently, because of their high flammability, are difficult to handle from the manufacturing viewpoint, it is proposed that the mixing of the doped ferroelectric perowskite materials each preformed as a crystalline main phase be carried out in the dry state. This can be accomplished, for example, in such a way that the ground dried materials are caused to pass several times through one or more vibration screens arranged one above the other.

With the aid of the charts illustrated in FIGS. 1 to 3, the invention is to be explained in detail. The chart in FIG. 1 shows, as curves 1 and 2, the course of increasing resistance of PTC-resistor materials with Curie temperatures of 120° C. in curve 1, and 180° C. in curve 2. The material shown in curve 1 was pure barium titanate, which was doped with 0.086 mol percent $Sb_2O_3$. The material II shown in curve 2 consisted of 84.3 mol percent BaO, 15.7 percent PbO, these molar percents being referred to the total molar amount of the cations, of 101.5 mol percent $TiO_2$, as well as 0.086 mol percent $Sb_2O_3$. The doping substance proportion is with the reference to the total molar amount of the converted product. Curve 3 illustrates the resistance increase of a two-phased PTC-resistor body composed of the two materials I and II in the ratio 1:1, in which the Curie temperature lies at 150° C. The material which was used as the basis for curve 4 was composed of the materials I and II in the ratio 1:2, with Curie temperature, accordingly, lying at 160° C. In FIG. 1 there also are plotted temperature ranges of increasing resistance for the materials I and II, as well as for the 1:1 mixed body and designated as 111, 112 and 113. The temperature ranges overlap in part in the example shown.

The chart according to FIG. 2 illustrates the course of the specific resistance in dependence on the applied field strength, measured at the temperature at which the particular specific resistance has its maximum. Curve 5 holds for material with a Curie temperature of 120° C., while curve 6 holds for material with the Curie temperature of 180° C. The B-values of these materials lie about between 6 and 10 percent. Curve 7 holds for a two-phase PTC-resistor body according to the invention, which has a resulting Curie temperature of 150° C. and curve 8 holds for such a body with a Curie temperature of 160°C.

The chart according to FIG. 3 shows the position of the load quotient in dependence on the mixing ratio. In abscissa direction there are plotted the percentages by weight of the main phase with a Curie temperature of 180° C. from 0 to 100 percent by weight and running oppositely thereto are plotted the percentages by weight of the material with a Curie temperature of 120° C. Further there are presented in abscissa direction, the Curie temperatures applying to the particular mixtures. In the case of simultaneous conversion of the oxide starting components the load quotients lie in the range A, while when the individual phases are converted separately from one another and the two-phase body is then prepared from the two, the load quotients lie in the range B. From this the improvement of the load quotients is apparent.

FIG. 4 illustrates a ceramic cold-conductor resistor according to the invention, which consists of the resistor body 10, the contact coverings 11 and 12, applied without blocking layer, and the outer connecting contacts 13 and 14.

FIG. 5 represents one edge portion C cut out of the body 10 in FIG. 4, on a larger scale. In this enlarged section there are schematically represented the two crystalline main phases. The crystal granules of one crystalline main phase are hatched perpendicularly to the body edge and the crystal granules of the other crystalline main phase are hatched parallel to the body edge.

The following example gives the production proportions for a ceramic PTC-resistor body according to the invention. Mol % a. Material I: (curie temperature 120° C.)

Weighed portion

| | |
|---|---|
| $BaCO_3$ | 100 Mol % |
| $TiO_2$ | 101 Mol % |
| $Sb_2O_3$ | 0.086 Mol % | b. Material II: (curie temperature 180° C.)

Weighed portion

| | |
|---|---|
| $BaCO_3$ | 84.3 Mol % |
| PbO | 15.7 Mol % |
| $TiO_2$ | 101.5 Mol% |
| $Sb_2O_3$ | 0.086 Mol % | c. Material III: (curie temperature 40° C.)

Weighed portion

| | |
|---|---|
| $BaCO_3$ | 85.5 Mol % |
| $SrCO_3$ | 14.5 Mol % |
| $TiO_2$ | 97.7 Mol % |
| $SnO_2$ | 3.5 Mol % |
| $Sb_2O_3$ | 0.124 Mol % |

These starting materials are ground in separate operations in ball mills, with water for 18 to 20 hours, then filtered off and thereupon dried. The conversion takes place, in the case of materials I and III, at temperatures of 1,000° to 1,100° C., and in the case of material II, at temperatures of 900° to 1,000° C., for a period in each case of 4 hours, after which the total amount weights about 1.5 kg. The converted products are ground separately from one another in ball mills under ethyl alcohol for about 18 hours, to granules sizes smaller than 3µ, then filtered off and dried. Resistor bodies produced from materials I and II by plastification, molding and sintering according to known processes produced PTC-resistor bodies with the resistance increase curves 1 and 2, respectively (FIG. 1) and with the varistor effect curves 5 and 6, respectively (FIG. 2), while the load quotients lie in the range A of FIG. 3.

For the production of a mixed body according to the invention, the materials I and II are mixed, for example, in the ratio of 1:1, ground, either before the mixing or during the mixing process, to granule sizes smaller than 3 microns under alcohol or, after previous separate grinding, mixed dry, the mixture is treated with plasticizing agents in themselves known (for example, 12 percent of a mixture of polyvinyl alcohol, glycerin and water), then, through pressing, shaped into the desired bodies, which bodies are sintered in an oxygen-containing atmosphere (for example, air) for 1 hour at 1,300° to 1,380° C. The thus resulting PTC-resistor bodies have a Curie temperature of 150° C. The load quotient amounts to 20 to 30 percent. In contrast, bodies with a gross chemical composition which likewise yields a Curie temperature of 150° C. but which were produced by simultaneous conversion of the oxide starting components, have only a load quotient which lies between 6 and 10 percent.

Changes may be made within the scope and spirit of the appended claims which define what is believed to be new and desired to have protected by Letters Patent.

We claim:

1. An electrical resistor having an increase of specific resistance on the order of four powers of 10 in a predetermined temperature range and having a specific resistance at temperatures below said range on the order of 100 ohm-cm. and below, and having a load quotient on the order of 20 to 30 percent, said resistor consisting of a body of sintered N-type conductivity ferroelectric materials each having a perowskite structure and each having the empirical formula $Me^{II}Me^{IV}O_3$ wherein $Me^{II}$ is at least one bivalent metal selected from the group consisting of the alkaline earth metals and lead and $Me^{IV}$ is at least one tetravalent metal selected from the group consisting of titanium, tin and zirconium, said body having N-type conductivity by virtue of the presence in the crystalline lattice of a dopant selected from the group consisting of antimony, niobium, bismuth, tungsten and rare earth metals, said body comprising two discrete crystalline phases in substantially equal amounts by weight, one of the phases consisting of a barium titanate lattice containing one of said dopants and having a Curie temperature of at least 120° C., and the other phase consisting of a barium titanate lattice containing one of said dopants and having a Curie temperature which differs from that of the first phase by at least 20° C., at least one of said phases being a substituted barium titanate.

2. An electrical resistor having an increase of specific resistance on the order of four powers of 10 in a predetermined temperature range and having a specific resistance at temperatures below said range on the order of 100 ohm-cm. and below, and having a load quotient on the order of 20 to 30 percent, said resistor consisting of a body of sintered N-type conductivity ferroelectric materials each having a perowskite structure and each having the empirical formula $Me^{II}Me^{IV}O_3$ wherein $Me^{II}$ is at least one bivalent metal selected from the group consisting of the alkaline earth metals and lead and $Me^{IV}$ is at least one tetravalent metal selected from the group consisting of titanium, tin and zirconium, said body having N-type conductivity by virtue of the presence in the crystalline lattice of a dopant selected from the group consisting of antimony, niobium, bismuth, tungsten and rare earth metals, said body comprising two discrete crystalline phases in substantially equal amounts by weight, one of the phases consisting of a barium titanate lattice containing one of said dopants and having a Curie temperature of at least 120° C., and the other phase consisting of a barium titanate lattice containing one of said dopants and having a Curie temperature which differs from that of the first phase by at least 20° C., at least one of said phases being a substituted barium titanate, the substituted barium titanate containing from 2 to 48 mol percent of an element selected from the group consisting of calcium and strontium in substitution for the corresponding amount of barium.

3. An electrical resistor having an increase of specific resistance on the order of four powers of 10 in a predetermined temperature range and having a specific resistance at temperatures below said range on the order of 100 ohm-cm. and below, and having a load quotient on the order of 20 to 30 percent, said resistor consisting of a body of sintered N-type conductivity ferroelectric materials each having a perowskite structure and each having the empirical formula $Me''Me^{IV}O_3$ wherein $Me''$ is at least one bivalent metal selected from the group consisting of the alkaline earth metals and lead and $Me^{IV}$ is at least one tetravalent metal selected from the group consisting of titanium tin and zirconium, said body having N-type conductivity by virtue of the presence in the crystalline lattice of a dopant selected from the group consisting of antimony, niobium, bismuth, tungsten and rare earth metals, said body comprising two discrete crystalline phases in substantially equal amounts by weight, one of the phases consisting of a barium titanate lattice containing one of said dopants and having a Curie temperature of at least 120° C., and the other phase consisting of a barium titanate lattice containing one of said dopants and having a Curie temperature which differs from that of the first phase by at least 20° C., at least one of said phases being a substituted barium titanate, the substituted barium titanate containing from 1 to 15 mol percent of a metal selected from the group consisting of tin and zirconium in substitution for the corresponding amount of titanium.

4. An electrical resistor having an increase of specific resistance on the order of four powers of 10 in a predetermined temperature range and having a specific resistance at temperatures below said range on the order of 100 ohm-cm. and below, and having a load quotient on the order of 20 to 30 percent, said resistor consisting of a body of sintered N-type conductivity ferroelectric materials each having a perowskite structure and each having the empirical formula $Me''Me^{IV}O_3$ wherein $Me''$ is at least one bivalent metal selected from the group consisting of the alkaline earth metals and lead and $Me^{IV}$ is at least one tetravalent selected from the group consisting of titanium, tin and zirconium, said body having N-type conductivity by virtue of the presence in the crystalline lattice of a dopant selected from the group consisting of antimony, niobium, bismuth, tungsten and rare earth metals, said body comprising two discrete crystalline phases in substantially equal amounts by weight, one of the phases consisting of a barium titanate lattice containing one of said dopants and having a Curie temperature of at least 120° C., and the other phase consisting of a barium titanate lattice containing one of said dopants and having a Curie temperature which differs from that of the first phase by at least 20° C., at least one of said phases being a substituted barium titanate, the substituted barium titanate containing from 2 to 48 mol percent of an element selected from the group consisting of calcium and strontium in substitution for the corresponding amount of barium and also containing from 1 to 15 mol percent of a metal selected from the group consisting of tin and zirconium in substitution for the corresponding amount of titanium.

5. An electrical resistor having an increase of specific resistance on the order of four powers of 10 in a predetermined temperature range and having a specific resistance at temperatures below said range on the order of 100 ohm-cm. and below, and having a load quotient on the order of 20 to 30 percent, said resistor consisting of a body of sintered N-type conductivity ferroelectric materials each having a perowskite structure and each having the empirical formula $Me''Me^{IV}O_3$ wherein $Me''$ is at least one bivalent metal selected from the group consisting of the alkaline earth metals and lead and $Me^{IV}$ is at least one tetravalent metal selected from the group consisting of titanium, tin and zirconium, said body having N-type conductivity by virtue of the presence in the crystalline lattice of a dopant selected from the group consisting of antimony, niobium, bismuth, tungsten and rare earth metals, said body comprising two discrete crystalline phases in substantially equal amounts by weight, one of the phases consisting of a barium titanate lattice containing one of said dopants and having a Curie temperature of at least 120° C., and the other phase consisting of a barium titanate lattice containing one of said dopants and having a Curie temperature which differs from that of the first phase by at least 20° C., at least one of said phases being a substituted barium titanate, the substituted barium titanate containing from 1 to 30 mol percent lead in substitution for the corresponding amount of barium.

6. The resistor of claim 1 wherein both of said phases are substituted barium titanate, one of which contains from 1 to 30 mol percent lead in substitution for the corresponding amount of barium, and the other of which contains from 2 to 48 mol percent of an element selected from the group consisting of calcium and strontium in substitution for the corresponding amount of barium, and from 1 to 15 mol percent of a metal selected from the group consisting of tin and zirconium in substitution for the corresponding amount of lead.

7. The resistor of claim 2 in which one phase has the formula $BaO \cdot 1.01(TiO_2)$ containing 0.086 mol percent $Sb_2O_3$ as a dopant and having a Curie temperature of 120° C. and the other phase has the formula $(Ba_{0.855}Sr_{0.145})\cdot(Ti_{0.977}Sn_{0.035})O_3$ containing 0.124 mol percent $Sb_2O_3$ as a dopant and has a Curie temperature of 40° C.

8. The resistor of claim 5 in which one phase has the formula $BaO \cdot 1.01(TiO_2)$ containing 0.086 mol percent $Sb_2O_3$ as a dopant and has a Curie temperature of 120° C. and the other phase consists of doped substituted barium titanate having the formula $(Ba_{0.843}Pb_{0.157})O \cdot 1.015(TiO_2)$ containing 0.086 mol percent $Sb_2O_3$ as a dopant and has a Curie temperature of 180°C.

9. The resistor of claim 6 in which one phase is a doped substituted barium titanate having the formula $(Ba_{0.855}Sr_{0.145})\cdot(Ti_{0.977}Sn_{0.035})O_3$ containing 0.124 mol percent $Sb_2O_3$ as a dopant and having a Curie temperature of 40° C. and the other phase is a doped substituted barium titanate having the formula $(Ba_{0.843}Pb_{0.157})O \cdot 1.015(TiO_2)$ containing 0.086 mol percent $Sb_2O_3$ as a dopant and having a Curie temperature of 180°C.

10. A method for producing an electrical resistor having an increase of specific resistance on the order of four powers of 10 in a predetermined temperature range and having a specific resistance at temperatures below said range on the order of 100 ohm-cm. and below, and having a load quotient on the order of 20 to 30 percent, which comprises first forming a plurality of compositions each having the empirical formula $Me''Me^{IV}O_3$ wherein $Me''$ is at least one bivalent metal selected from the group consisting of the alkaline earth metals and lead, and $Me^{IV}$ is at least one tetravalent metal selected from the group consisting of titanium, tin and zirconium, each composition having N-type conductivity by virtue of the presence in the crystalline lattice of a dopant selected from the group consisting of antimony, niobium, bismuth, tungsten, and rare earth metals, the Curie temperatures of said compositions differing by at least 20° C., heating each of said compositions individually at temperatures up to 1,100° C. to produce a perowskite structure in each, mixing the resulting compositions in substantially equal amounts by weight, shaping the resulting mixture, and sintering the resulting shaped mixture for about 1 hour at a temperature between 1,300° and 1,380° C.

11. The method of claim 10 in which said mixing takes place in a liquid medium which is inert toward the ingredients of the mixture.

12. The method of claim 10 in which said mixing takes place in the dry state.

* * * * *